(12) United States Patent
Flores-Garay et al.

(10) Patent No.: US 8,323,116 B2
(45) Date of Patent: Dec. 4, 2012

(54) UNIVERSAL JOINT

(75) Inventors: Jorge Flores-Garay, Freeland, MI (US);
Keith A. Kozlowski, Lynn Haven, FL (US); Eduardo R. Mondragon-Parra, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 260 days.

(21) Appl. No.: 12/726,472

(22) Filed: Mar. 18, 2010

(65) Prior Publication Data
US 2011/0086714 A1    Apr. 14, 2011

Related U.S. Application Data

(63) Continuation-in-part of application No. 11/958,056, filed on Dec. 17, 2007, now Pat. No. 7,887,423.

(60) Provisional application No. 61/161,344, filed on Mar. 18, 2009.

(51) Int. Cl.
*F16D 3/221* (2006.01)
(52) U.S. Cl. ....................................... 464/141
(58) Field of Classification Search .......... 464/139–141, 464/145, 905
See application file for complete search history.

(56) References Cited

U.S. PATENT DOCUMENTS

| | | |
|---|---|---|
| 1,103,716 A | 7/1914 | Wallbillich |
| 1,763,206 A | 6/1930 | Woveris |
| 3,296,830 A | 1/1967 | Runkle |
| 4,019,347 A | 4/1977 | Krude |
| 4,224,808 A | 9/1980 | Gehrke |
| 4,472,159 A * | 9/1984 | Krude .......................... 464/141 |
| 4,556,400 A | 12/1985 | Krude et al. |

(Continued)

FOREIGN PATENT DOCUMENTS
FR    1218118    *    5/1960
(Continued)

OTHER PUBLICATIONS

"Basic Requirements for Constant Velocity Universal Joints" Universal Joint and Driveshaft Design Manual, AE-7, Society of Automotive Engineers, Inc., Warrendale, PA, pp. 99-101, TJ1079.S62 1979.*

(Continued)

*Primary Examiner* — Gregory Binda
(74) *Attorney, Agent, or Firm* — Cantor Colburn LLP

(57) ABSTRACT

A constant velocity joint includes an outer member defining an interior opening and a plurality comprising at least four grooves disposed within the interior opening and extending along a first longitudinal axis with each of the grooves being parallel to the other grooves and the first longitudinal axis, and an inner member disposed within the interior opening having a second longitudinal axis and defining a plurality of pockets corresponding to the grooves disposed radially about the second longitudinal axis with each of the plurality of pockets opposing one of the plurality of grooves. The joint further includes a plurality of drive balls corresponding to the grooves, each drive ball having a spherical shape and rotatably disposed within one of the plurality of pockets and moveably disposed within one of the plurality of grooves, wherein the outer member, inner member and plurality of drive balls comprise a constant velocity joint.

19 Claims, 9 Drawing Sheets

U.S. PATENT DOCUMENTS

| | | | |
|---|---|---|---|
| 4,611,373 | A | 9/1986 | Hazebrook |
| 4,685,897 | A | 8/1987 | Krude |
| 4,753,626 | A | 6/1988 | Hazebrook et al. |
| 4,832,657 | A | 5/1989 | Hahn |
| 5,230,659 | A | 7/1993 | Bird et al. |
| RE34,341 | E | 8/1993 | Fukumura et al. |
| 5,267,905 | A | 12/1993 | Wenzel et al. |
| 5,732,657 | A | 3/1998 | Idbeis |
| 6,264,568 | B1 | 7/2001 | Frazer et al. |
| 6,280,338 | B1 | 8/2001 | Hayama et al. |
| 6,537,045 | B2 | 3/2003 | Riegger et al. |
| 6,685,571 | B1 | 2/2004 | Smith |
| 6,910,970 | B2 | 6/2005 | Kobayashi |
| 7,624,819 | B1 | 12/2009 | LeBlanc et al. |
| 7,690,999 | B2 | 4/2010 | Nozaki et al. |
| 2005/0272510 | A1* | 12/2005 | Nakagawa et al. ........... 464/145 |
| 2007/0161428 | A1 | 7/2007 | Nakao et al. |
| 2009/0156319 | A1 | 6/2009 | Mondragon et al. |

FOREIGN PATENT DOCUMENTS

| | | |
|---|---|---|
| GB | 1596837 | 9/1981 |
| WO | 8809445 A1 | 1/1988 |

OTHER PUBLICATIONS

E.R, Wagner, P.E.—Saginaw Steering Gear Div., GMC, "Double Offset Universal Joint" (End Motion Type), Section 3.2.13, pp. 167-170.

\* cited by examiner

UNIVERSAL JOINT

CROSS-REFERENCES TO RELATED APPLICATIONS

This patent application is a continuation in part of and claims priority to U.S. patent application Ser. No. 11/958,056 filed on Dec. 17, 2007, now U.S. Pat. No. 7,887,423 issued on Feb. 15, 2011, and also claims priority to U.S. Provisional Patent Application Ser. No. 61/161,344 filed Mar. 18, 2009, both of which are incorporated herein by reference in their entirety.

FIELD OF THE INVENTION

The subject invention relates to a universal joint for transmitting torque between a driving shaft and a driven shaft as the driving shaft and the driven shaft articulate relative to each other.

BACKGROUND

Current development in the field of universal joints is primarily directed toward improving performance of the universal joint by increasing the torque transmitting capability of the universal joint and reducing noise and vibration of the universal joint. The improved performance of the universal joint has resulted in an increased cost to manufacture the universal joint. However, there is still a demand for inexpensive and easily produced universal joints.

U.S. Pat. No. 4,832,657 (the '657 patent) discloses such an inexpensive and easily produced universal joint. The universal joint comprises an outer member. The outer member defines an interior opening and a plurality of grooves extending along a longitudinal axis and disposed within the interior opening. Each of the grooves is parallel to all other of the grooves and the longitudinal axis and includes a straight linear profile along the longitudinal axis. An inner member is disposed within the interior opening and defines a plurality of apertures extending radially outward from the longitudinal axis with each of the apertures opposing one of the grooves. The inner member further defines a center bore concentric with the longitudinal axis and extending through said apertures. The universal joint further comprises a plurality of drive balls having a spherical shape. One of the drive balls is supported by and rotatable within each of the apertures, and supported by one of the grooves in rolling engagement. A center pin is disposed within the center bore and engages the drive balls in rolling engagement. However, the universal joint disclosed in the '657 patent does not include a structure preventing the drive balls disposed between the apertures and the grooves from rattling therebetween as the inner member articulates relative to the outer member, thereby creating undesirable noise and vibration.

U.S. Pat. No. 6,685,571 (the '571 patent) also discloses such an inexpensive and easily produced universal joint. The universal joint comprises an outer member. The outer member defines an interior opening and a plurality of grooves disposed within the interior opening. The grooves extend along a longitudinal axis. An inner member is disposed within the interior opening and defines a plurality of pockets. The pockets are disposed radially about the longitudinal axis with each of the pockets opposing one of the grooves. The universal joint disclosed in the '571 patent further comprises a plurality of drive balls having a spherical shape. One of the drive balls is supported by and rotatable within one of the pockets, and supported by one of the grooves in rolling engagement. Each of the grooves includes a curved profile along the longitudinal axis to keep the drive balls in contact with the groove while the universal joint is articulated.

While these universal joint designs may be useful, there remains a need for universal joints having improved performance characteristics, particularly improved torque transmitting capability and reduced noise and vibration, which can be readily manufactured for a low cost relative to other universal joint designs.

SUMMARY OF THE INVENTION

In an exemplary embodiment of the present invention, a constant velocity joint is provided. The constant velocity joint includes an outer member defining an interior opening and a plurality comprising at least four grooves disposed within the interior opening and extending along a first longitudinal axis with each of the plurality of grooves being parallel to all other of the plurality of grooves and the first longitudinal axis. The joint also includes an inner member disposed within the interior opening having a second longitudinal axis and defining a plurality of pockets corresponding to the plurality of grooves disposed radially about the second longitudinal axis with each of the plurality of pockets opposing one of the plurality of grooves. The joint further includes a plurality of drive balls corresponding to the plurality of grooves, each drive ball having a spherical shape and rotatably disposed within one of the plurality of pockets and moveably disposed within one of the plurality of grooves, wherein the outer member, inner member and plurality of drive balls comprise a constant velocity joint.

The above features and advantages and other features and advantages of the present invention are readily apparent from the following detailed description of the invention when taken in connection with the accompanying drawings.

BRIEF DESCRIPTION OF THE DRAWINGS

Advantages of the present invention will be readily appreciated as the same becomes better understood by reference to the following detailed description when considered in connection with the accompanying drawings.

DESCRIPTION OF THE EMBODIMENTS

Figure 1:
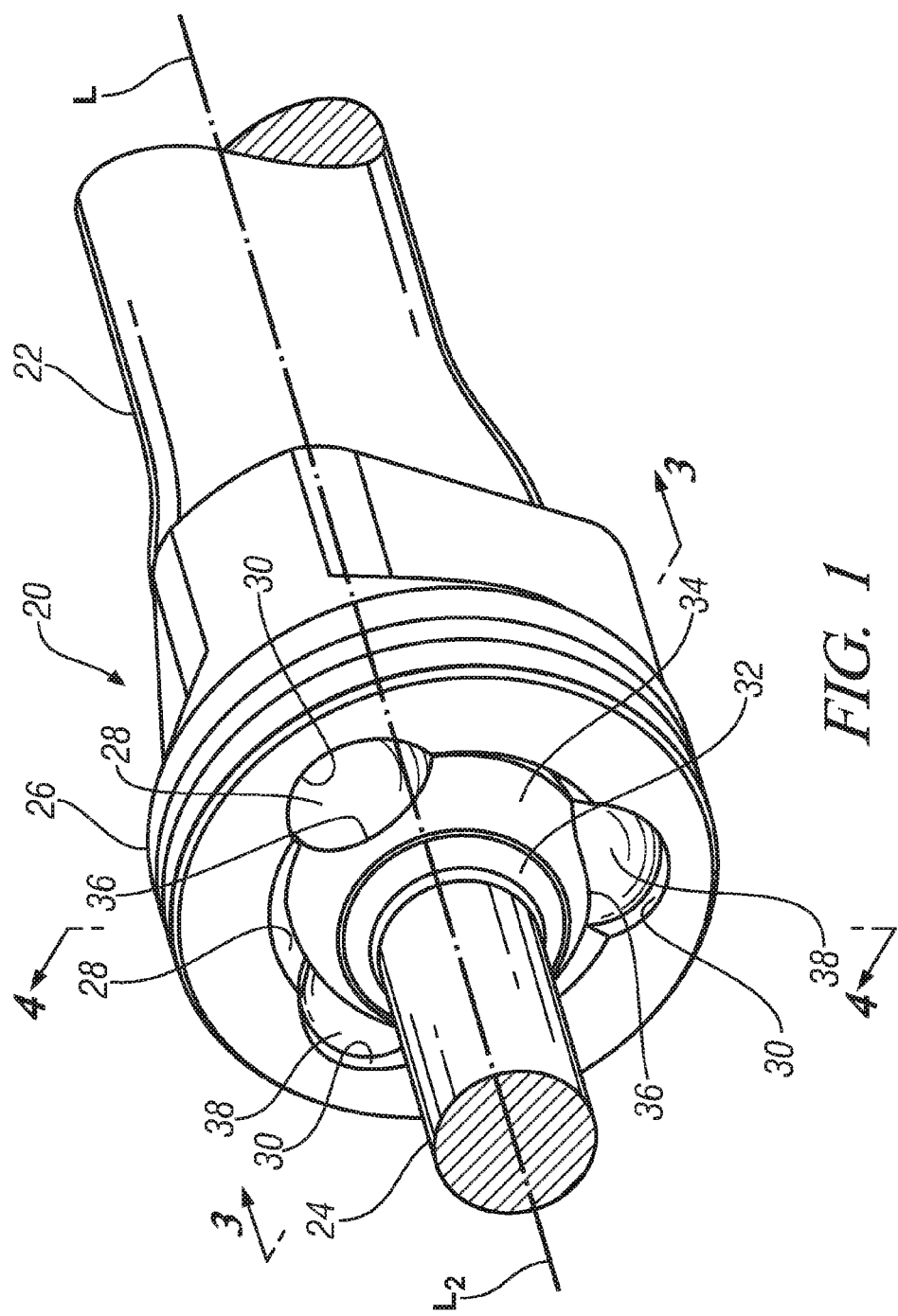
FIG. 1 is a perspective view of an exemplary embodiment of a constant velocity joint as disclosed herein.
Figure 2:
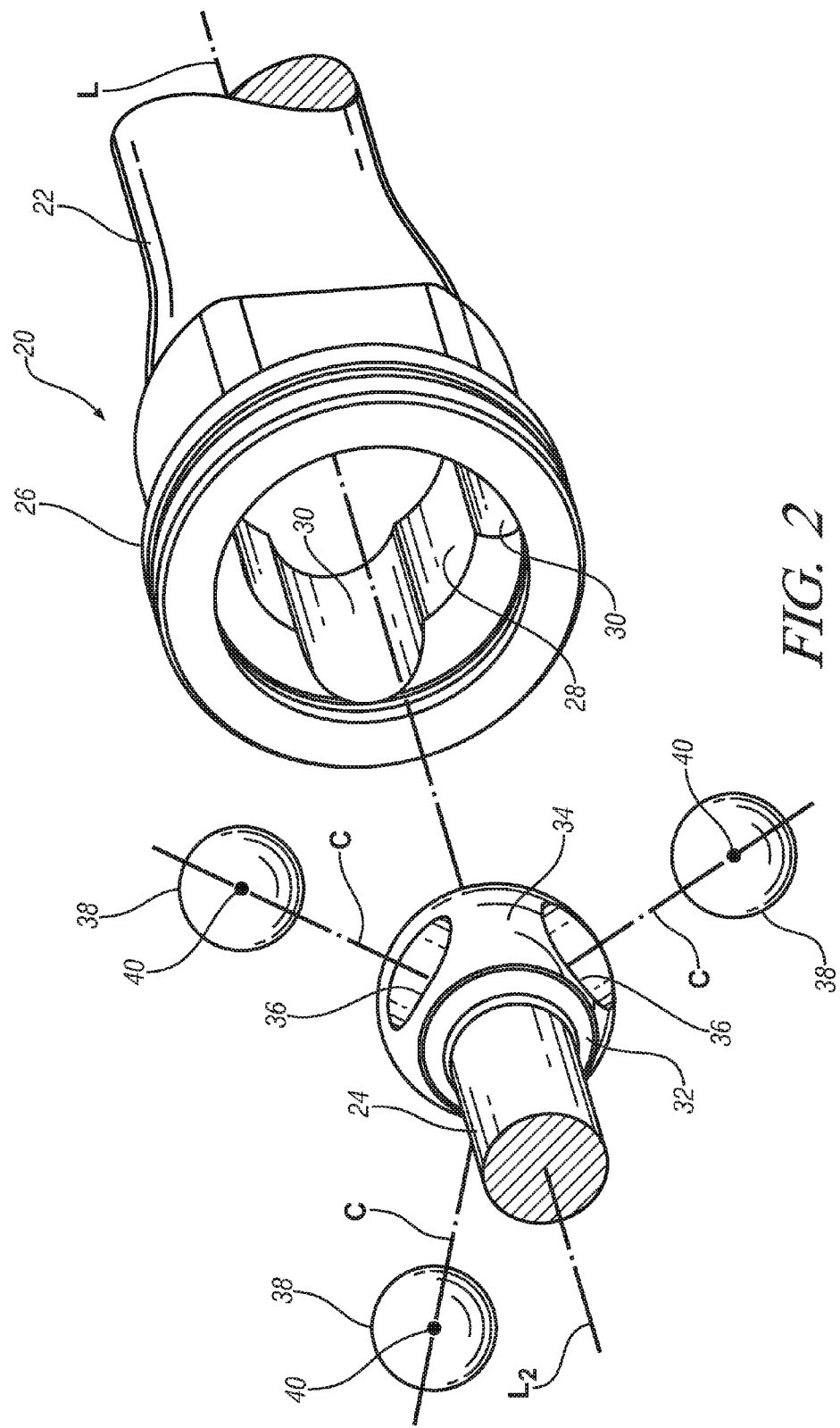
FIG. 2 is an disassembled perspective view of the constant velocity joint of FIG. 1.
Figure 3:
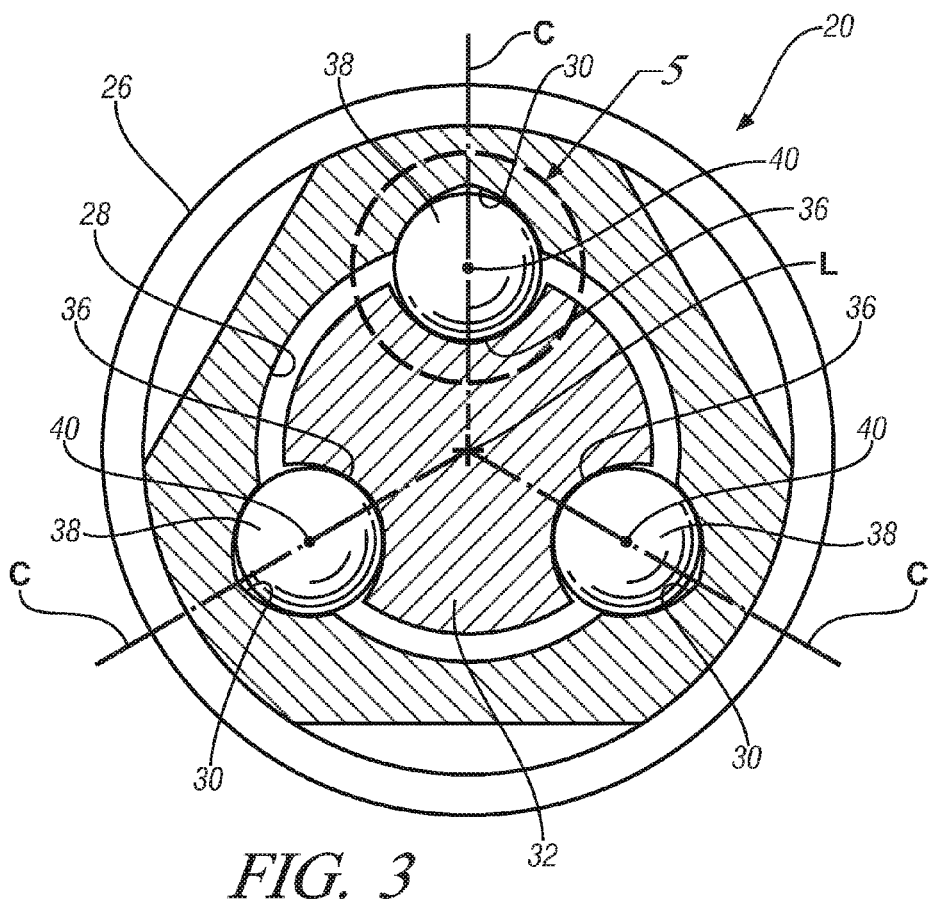
FIG. 3 is a transverse cross-sectional view of the constant velocity joint of FIG. 1 taken along section 3-3.

The following description is merely exemplary in nature and is not intended to limit the present disclosure, application or uses. It should be understood that throughout the drawings, corresponding reference numerals indicate like or corresponding parts and features.

Referring to the Figures, a universal joint is shown generally at 20. The universal joint 20 transmits torque, i.e., rotational movement, between a driving shaft 22 and a driven shaft 24 as the driving shaft 22 and the driven shaft 24 articulate relative to each other. Universal joint 20 is particularly suitable for use as a constant velocity joint, and may be used in any suitable application requiring transmission of torque along a series of shafts, and is particularly suited for use in automotive axial drive shafts, and is especially useful in the drivetrain of front-wheel-drive vehicles between the transaxle differential and the driving wheels as inboard and outboard CV joints. However, it should be appreciated that the CV joint 20, or a first shaft 22 that includes first CV joint 20 and a second CV joint (not shown), may be utilized in other situations in which a torque must be transmitted between shafts that articulate (i.e., move relative to each other, particularly those where the shafts may be angulated or telescoped, or both, relative to one another).

The universal joint 20 comprises an outer member 26. The outer member 26 is coupled to the driving shaft 22. The outer member 26 and the driving shaft 22 may be separate parts fixedly attached to each other for rotational movement together. Alternatively, the outer member 26 and the driving shaft 22 may be integrally formed as a single part.

Figure 7A:
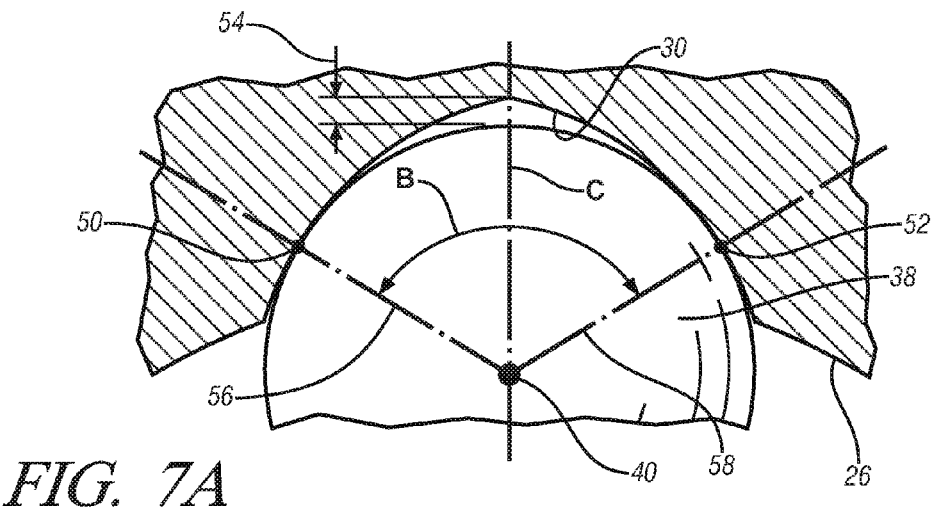
FIGS. 7A-7C are further enlarged fragmentary cross-sectional views of region 7 of FIG. 5 for several embodiments of the curved non-circular cross-section grooves, including a gothic arch shape (FIG. 7A), an elliptical shape (FIG. 7B) and a parabolic shape (FIG. 7C.
Figure 7B:
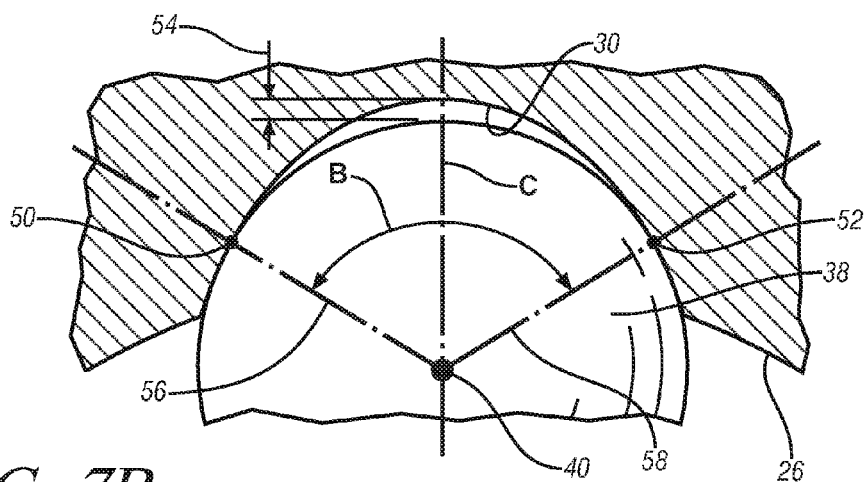
Figure 7C:
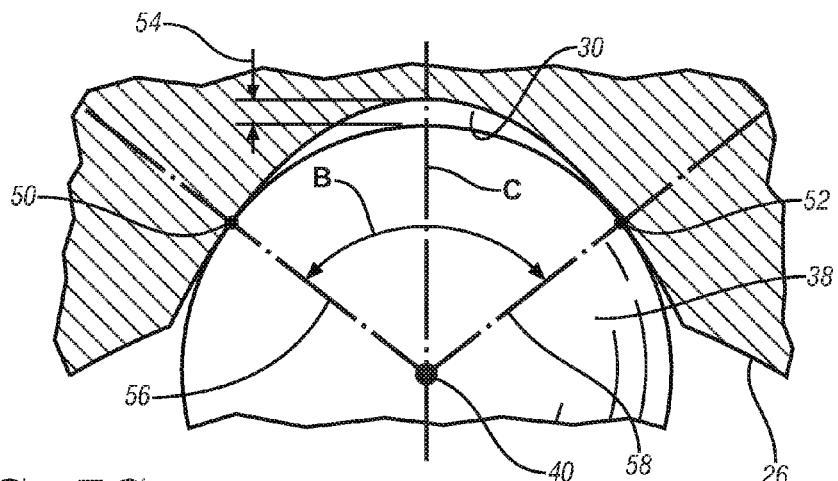

The outer member 26 defines an interior opening 28 and a plurality of grooves 30 disposed within the interior opening 28. The grooves 30 extend along a longitudinal axis L of outer member 26 and driving shaft 22. Each of the grooves 30 is parallel to all other of the grooves 30, and includes a straight linear profile along and parallel to the longitudinal axis L. Preferably, the grooves 30 are spaced from each other radially about the longitudinal axis L. The grooves 30 include a cross-section transverse to the longitudinal axis L. The cross-section of the grooves 30 includes a non-circular shape. The non-circular cross-section of the grooves 30 may include a gothic arch (FIG. 7A), an ellipse (FIG. 7B) or a parabola (FIG. 7C). It should be appreciated that the non-circular cross-section of the grooves 30 may also include a shape other than the gothic arch, the ellipse or the parabola.

An inner member 32 is disposed within the interior opening 28 of the outer member 26. The inner member 32 is coupled to the driven shaft 24. The inner member 32 and the driven shaft 24 may be separate parts fixedly attached to each other for rotational movement together. Alternatively, the inner member 32 and the driven shaft 24 may be integrally formed as a single part. The inner member 32 and driven shaft 24 extend along a longitudinal axis $L_2$. When the joint is not articulated, the longitudinal axis L of driving shaft 22 and outer member 26 and longitudinal axis $L_2$ of inner member 32 and driven shaft 24 are collinear.

Figure 6A:
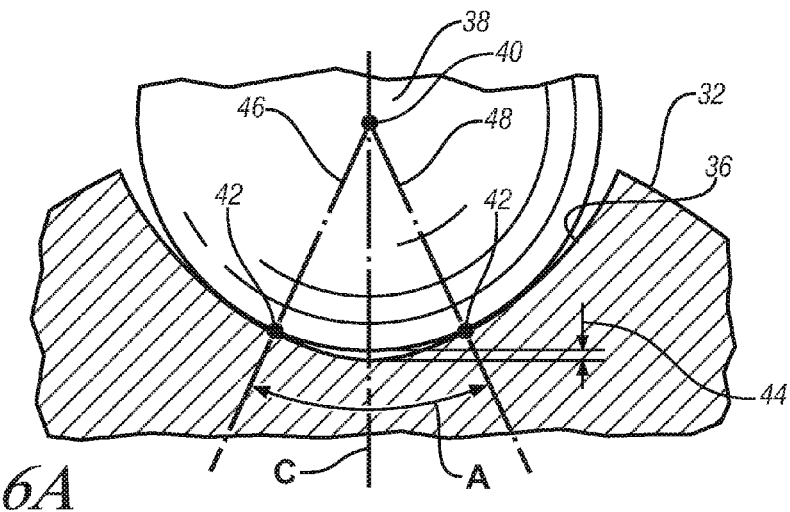
FIGS. 6A-6C are further enlarged fragmentary cross-sectional views of region 6 of FIG. 5 for several embodiments of the curved, non-spherical pockets, including a gothic arch shape (FIG. 6A), an elliptical shape (FIG. 6B) and a parabolic shape (FIG. 6C.
Figure 6B:
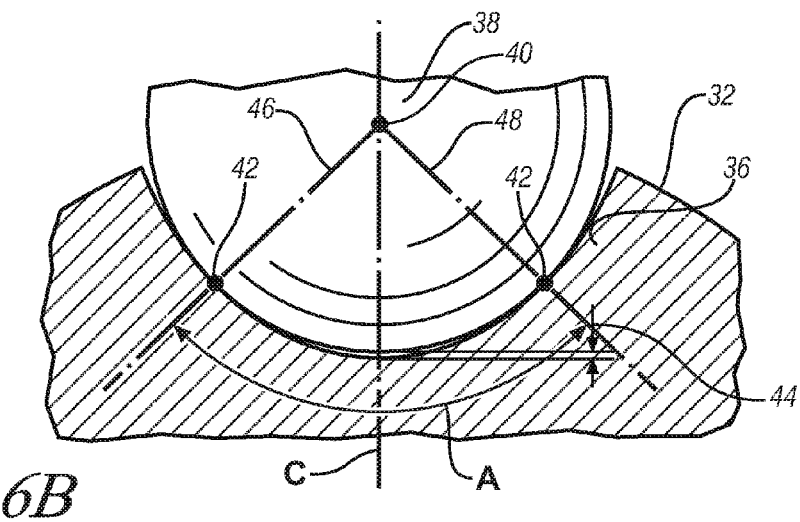
Figure 6C:
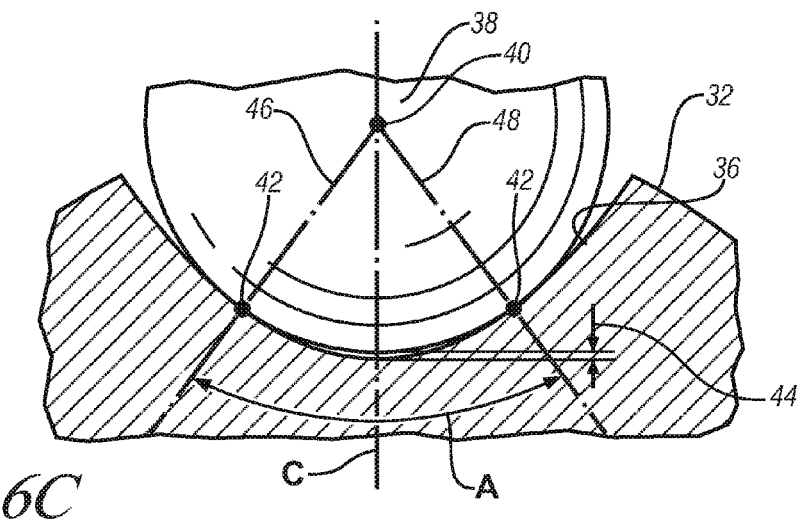

The inner member 32 includes a generally bulbous end 34, which is disposed within the interior opening 28 of the outer member 26. The inner member 32 defines a plurality of pockets 36 at the bulbous end 34. The pockets 36 are equally spaced from each other, disposed radially about and spaced from the longitudinal axis $L_2$. Each of the pockets 36 opposes one of the grooves 30, i.e., there are an equal number of opposing pockets 36 and grooves 30. The pockets 36 may have any suitable pocket shape, including various non-spherical and spherical pocket shapes. It should be appreciated that the non-spherical shape of the pockets 36 may include a cross-section transverse to the longitudinal axis $L_2$ that includes a non circular shape, with the cross-sectional shape of the pockets 36 being different from the cross-sectional shape of the grooves 30. The non-spherical shape of the pockets 36 may be defined by a gothic arch (FIG. 6A) rotated about a central axis C, an ellipse (FIG. 6B) rotated about the central axis C or by a parabola (FIG. 6C) rotated about the central axis C. It should be appreciated that the non-spherical shape of the pockets 36 may also be defined by a non-spherical curved shape other than the gothic arch, the ellipse or the parabola rotated about the central axis C. The spherical shape of the pockets 36 may include any suitable spherical shape, such as various partially spherical or semi-spherical shapes. The spherical shape of the pockets 36 may include a cross-section transverse to the longitudinal axis $L_2$ that includes a circular shape, with the cross-sectional shape of the pockets 36 being different from the cross-sectional shape of the grooves 30.

The universal joint 20 further comprises a plurality of drive balls 38. Each of the drive balls 38 includes a spherical shape and is partially disposed and rotatable within one of the pockets 36. Each of the drive balls 38 is also partially disposed within one of the grooves 30 for rolling engagement therewith. Each of the drive balls 38 includes a ball center 40 and the central axis C. The central axis C extends through the ball center 40 of each of the drive balls 38 and intersects the longitudinal axis $L_2$ at a perpendicular angle.

Figure 5:
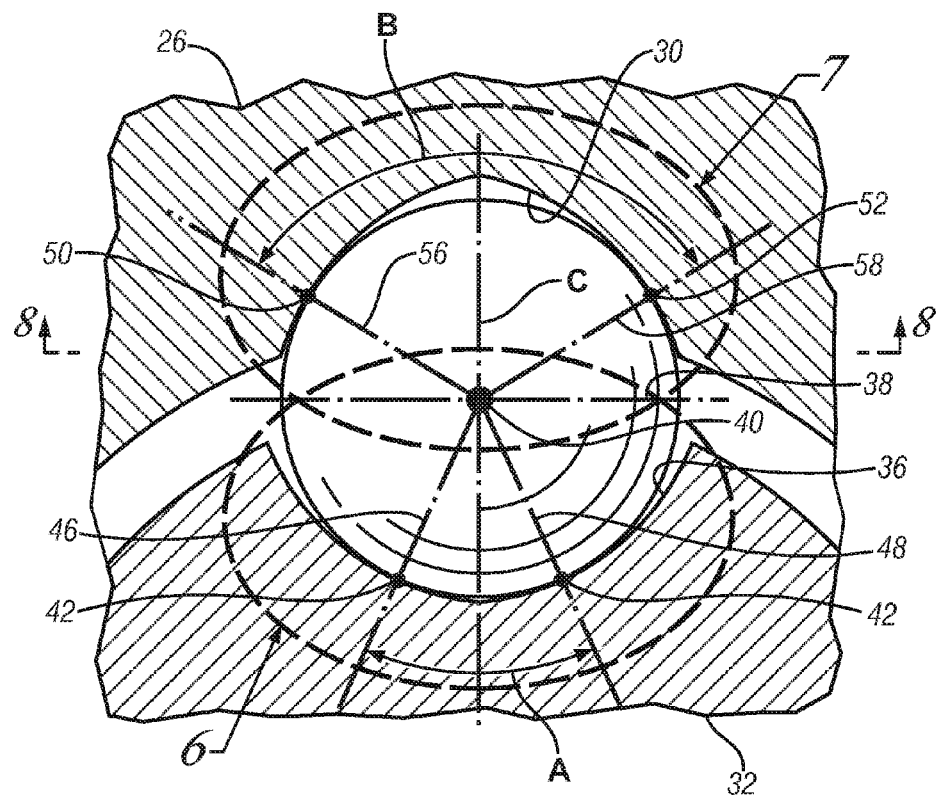
FIG. 5 is an enlarged fragmentary transverse cross-sectional view of region 5 of FIG. 3.
Figure 8:
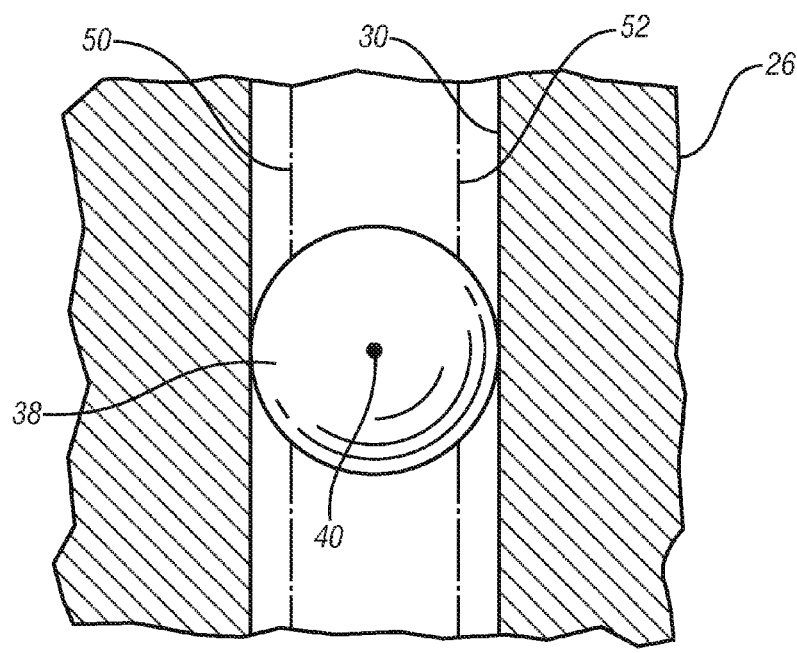
FIG. 8 is a partial cross-sectional view of section 8-8 of FIG. 5.

Each of the drive balls 38 contacts one of the pockets 36 along an annular contact interface 42, i.e., the non-spherical shape of the pockets 36 engage the spherical shape of the drive balls 38 along the annular contact interface 42, FIGS. 5 and 6. Because the spherical shape of the drive balls 38 is different from the non-spherical shape of the pockets 36, the drive balls 38 only contact the pockets 36 along the annular contact interface 42, i.e., an annular ring concentric with the central axis C of the drive balls 38. The location of the annular contact interface 42 depends on the non-spherical shape of the pockets 36. Accordingly, because the only contact between the drive balls 38 and the pockets 36 is along the annular contact interface 42, a first surface area of the pockets 36 below the annular contact surface nearer a base of the pocket 36 and a second surface area of the pockets 36 above the annular contact interface 42 nearer an outer perimeter of the pockets 36 do not contact the spherical shape of the drive balls 38. Accordingly, each of the pockets 36 and each of the drive balls 38 therein define a pocket separation distance 44, FIG. 6, between the pockets 36 and the drive balls 38 along the central axis C near the base of the pocket 36.

Each of the drive balls 38 includes a first pocket radial line 46 and a second pocket radial line 48. The first pocket radial line 46 extends from the ball center 40 of the drive ball 38 to the annular contact interface 42. The second pocket radial line 48 is coplanar with the first pocket radial line 46 and extends from the ball center 40 of the drive ball 38 to the annular contact interface 42 on an opposing side of the central axis C relative to the first pocket radial line 46. The first pocket radial line 46 and the second pocket radial line 48 define a pocket contact angle A measured between the first pocket radial line 46 and the second pocket radial line 48. The pocket contact angle A is less than one hundred eighty degrees)(180°). Preferably, the pocket contact angle A is less than one hundred degrees)(100°).

Each of the drive balls 38 contacts one of the grooves 30 along a first linear interface 50 and a second linear interface 52, i.e., the non-circular cross-section of the grooves 30 engages the spherical shape of the drive balls 38 along the first linear interface 50 and the second linear interface 52, FIGS. 5 and 7. Because the spherical shape of the drive balls 38 is different from the non-circular cross-section of the grooves 30, the drive balls 38 contact the grooves 30 along two linear paths, i.e., the first linear interface 50 and the second linear interface 52. This is a variation of a two-point contact extended along the straight linear profile of the grooves 30. The location of the first linear interface 50 and the second linear interface 52 depends upon the non-circular cross-sectional shape of the grooves 30. Accordingly, because the only contact between the drive balls 38 and the grooves 30 is along the first linear interface 50 and the second linear interface 52, a first surface area of the grooves 30 above and between the first linear interface 50 and the second linear interface 52 nearer a base of the groove 30 and a second surface area of the grooves below the first linear interface 50 and the second linear interface 52 nearer an outer edge of the grooves 30 do not contact the spherical shape of the drive balls 38. Accordingly, each of the grooves 30 and each of the drive balls 38 therein define a groove separation distance 54 between the grooves 30 and the drive balls 38 along the central axis C near the base of the grooves 30.

Each drive ball 38 includes a first groove radial line 56 and a second groove radial line 58. The first groove radial line 56 extends between the ball center 40 of the drive ball 38 and the first linear interface 50. The second groove radial line 58 extends between the ball center 40 of the drive ball 38 and the second linear interface 52 on an opposing side of the central axis C relative to the first groove radial line 56. The first groove radial line 56 and the second groove radial line 58 define a groove contact angle B measured between the first groove radial line 56 and the second groove radial line 58.

The groove contact angle B is greater in magnitude, i.e., larger in value, than the pocket contact angle A, or stated in the reverse, the pocket contact angle A is lesser in magnitude, i.e., smaller in value, than the groove contact angle B. The smaller pocket contact angle A urges each of the drive balls 38 upward against the grooves 30 as the inner member 32 articulates relative to the outer member 26. The pocket contact angle A produces a radial load along the central axis C of the drive balls 38 outward away from the longitudinal axis $L_2$. The groove contact angle B produces a radial load along the central axis C of the drive balls 38 inward toward the longitudinal axis $L_2$. The radial load produced from the pocket contact angle A is greater than the radial load produced by the groove contact angle B because the pocket contact angle A is smaller than the groove contact angle B. Thus, a net radial load is created urging the drive balls 38 outward away from the longitudinal axis $L_2$ and into the grooves 30. It should be appreciated that the larger groove contact angle B permits more of the load to be directed in a direction transverse to the longitudinal axis $L_2$, and therefore the smaller pocket contact angle A produces a higher radial load along the central axis C.

Figure 4:
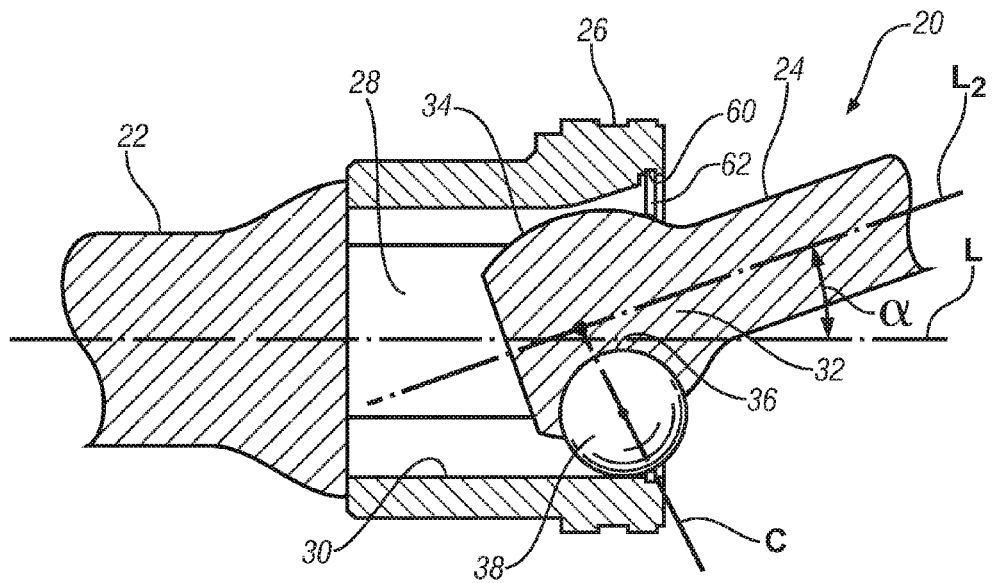
FIG. 4 is a longitudinal cross-sectional view of the constant velocity joint of FIG. 1 taken along section 4-4.

A retaining mechanism 62, FIG. 4, retains the bulbous end 34 of the inner member 32 and the drive balls 38 within the interior opening 28 of the outer member 26. The retaining mechanism 62 may include recess 60 defined by the outer member 26 within the interior opening 28, with a spring C-clip disposed within the recess 60. However, it should be appreciated that the retaining mechanism 62 may include some other similar device capable of preventing the removal of the inner member 32 from the interior opening 28 of the outer member 26 without significantly interfering with articulation of the inner member 32 relative to the outer member 26.

As illustrated in FIGS. 1-8, in an exemplary embodiment, the plurality of pockets 36 is equal to three pockets 36, the plurality of grooves 30 is equal to three grooves 30 and the plurality of drive balls 38 is equal to three drive balls 38. However, it should be appreciated that the number of plurality of pockets 36 may be equal to two pockets 36 or greater than three pockets 36, the plurality of grooves 30 may be equal to two grooves 30 or greater than three grooves 30 and the plurality of drive balls 38 may be equal to two drive balls 38 or greater than three drive balls 38.

Figure 9:
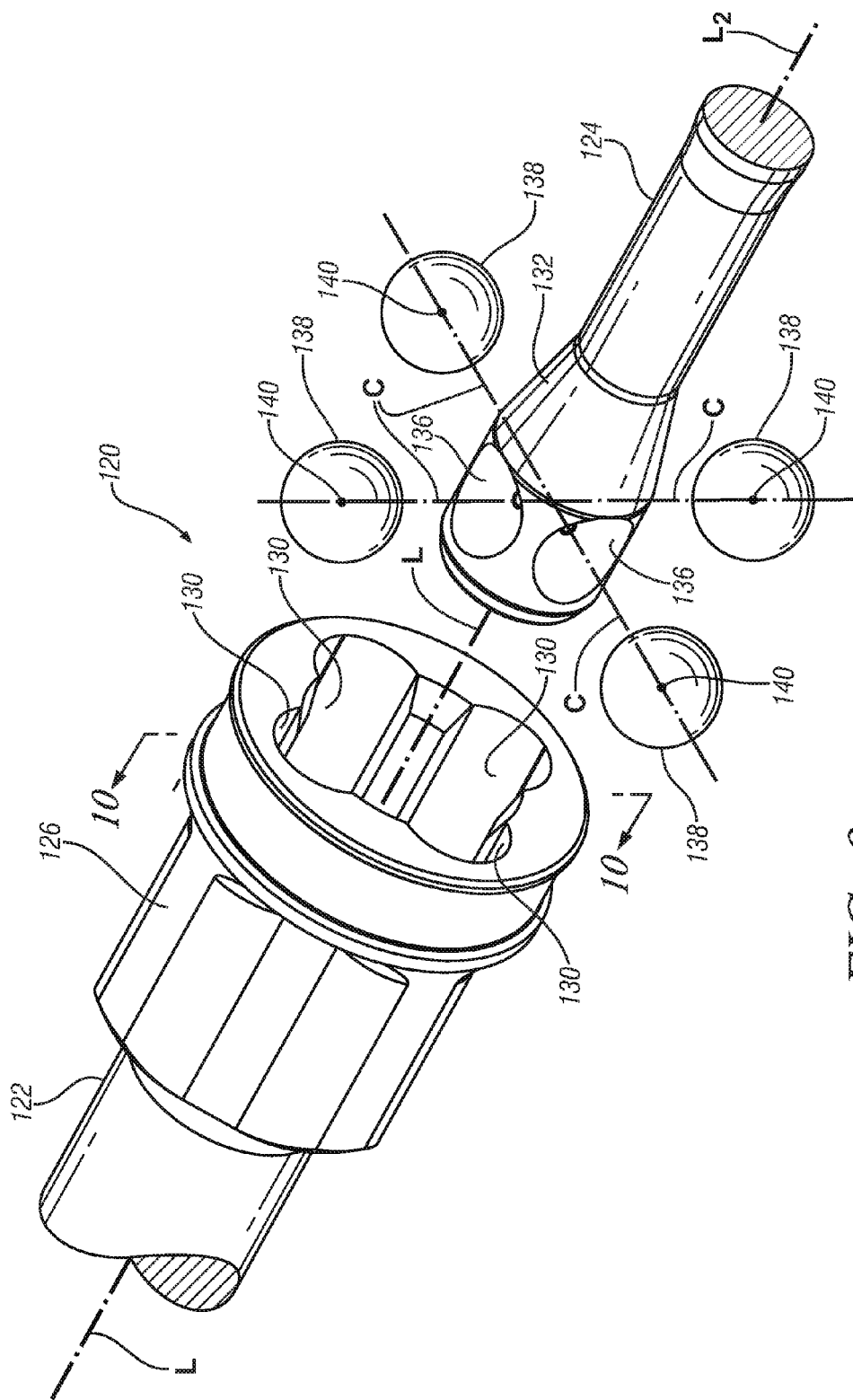
FIG. 9 is an disassembled perspective view of a second exemplary embodiment of a constant velocity joint as disclosed herein.
Figure 10:
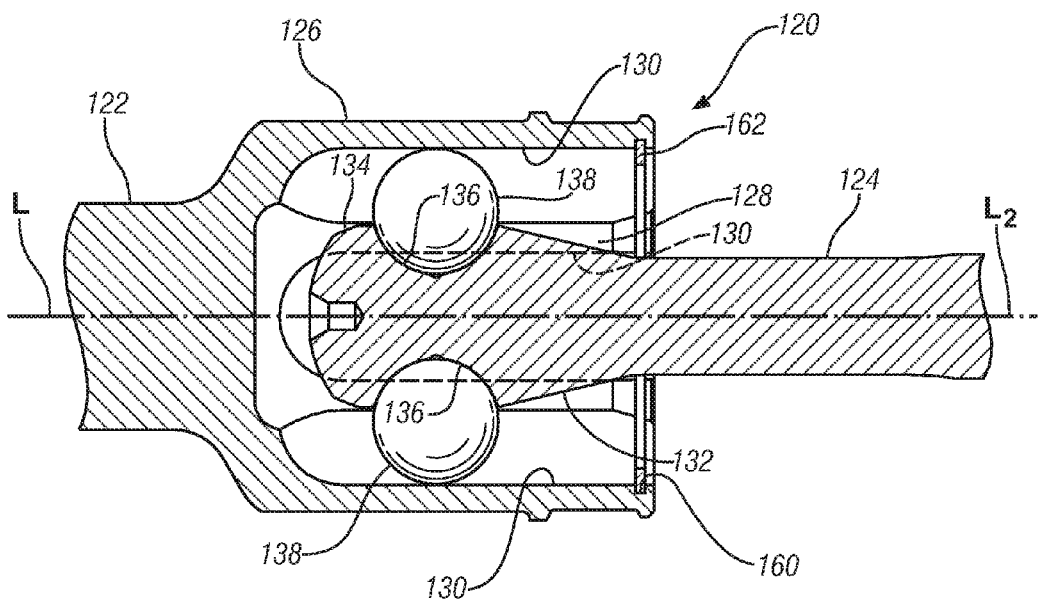
FIG. 10 is a cross-sectional view of the second exemplary embodiment of FIG. 9 taken along section 10-10 with the joint assembled.
Figure 11:
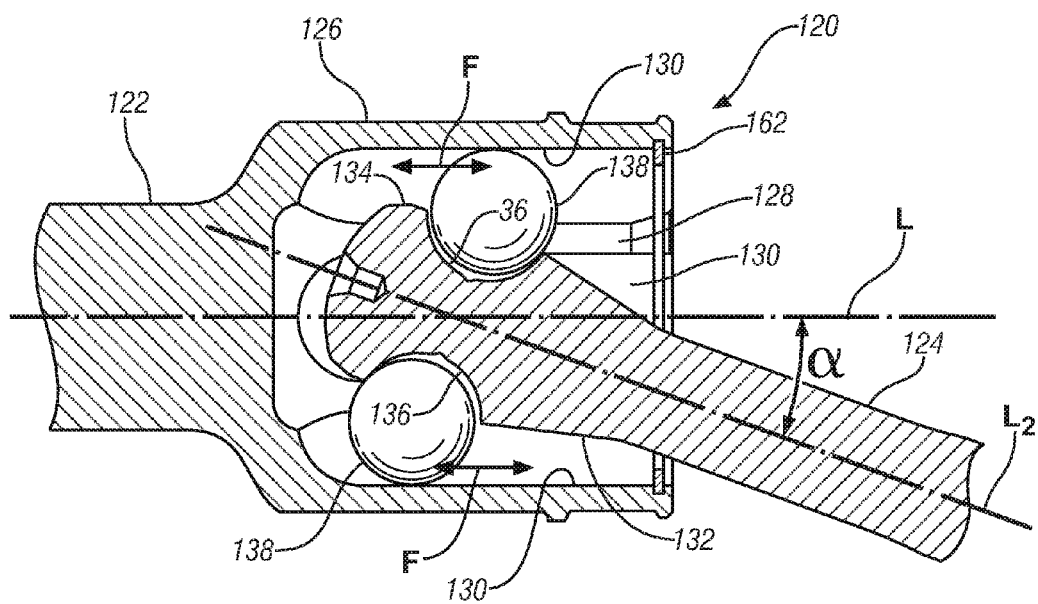
FIG. 11 is a cross-sectional view of the constant velocity joint of FIG. 11 in an articulated position with the joint assembled.
Figure 12:
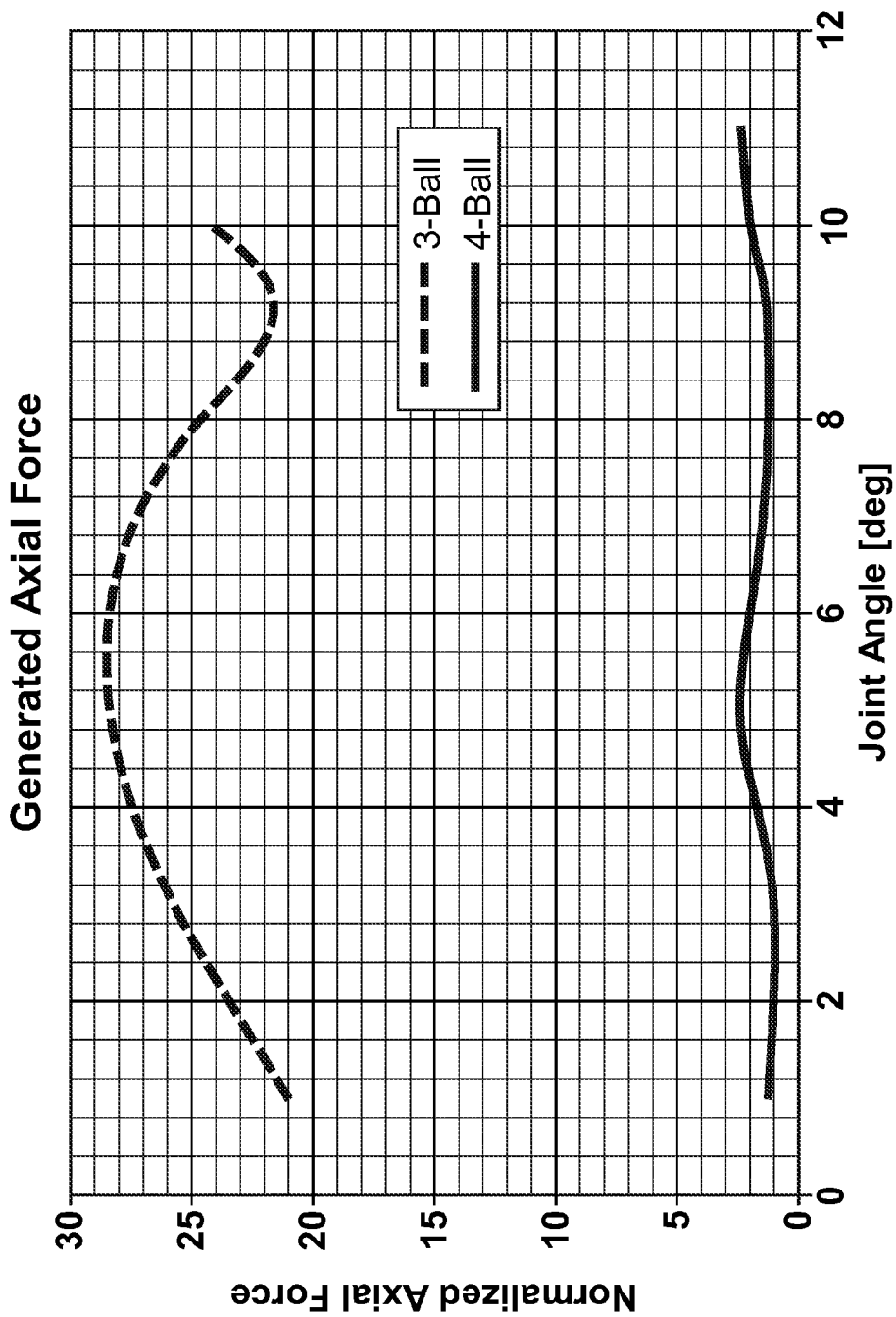
FIG. 12 is a plot of normalized generated axial force as a function of joint angle for a three ball and four ball constant velocity joint as disclosed herein.

Three lobe constant velocity joints as illustrated in FIGS. 1-8 are very useful for many applications. However, the three lobe constant velocity joint 20 that includes three equally spaced drive balls 38 described above, generally produces relatively higher generated axial forces than joints having four equally spaced drive balls 38, FIGS. 9-11, as illustrated in FIG. 12. This is also true for other joints having odd integer numbers of drive balls 38 as compared to joints having even integer numbers of drive balls. In the case of a three ball joint, this is because as the constant velocity joint 20 is articulated while it is rotating, one of the drive balls 38 is translated within its groove 30 in a first direction while the other two drive balls 38 are translated within their respective grooves 30 in a second direction opposite the first direction. The friction between the drive balls 38 and the grooves 30 generate respective axial force vectors along outer member 26 and driving shaft 22 and resolved force vectors along driven shaft 24, with the force vector generated by the one drive ball 38 translating in the first direction being unequal to the force vectors generated by the other two drive balls 38 translating in the opposite second direction, resulting in a net axial generated force input along the shafts. As the constant velocity joint 20 continues its rotation, for example, through another half rotation (i.e., 180°) the unbalanced force vectors reverse their direction, thereby reversing the direction of the net axial force input along the shafts. These unbalanced generated axial forces are undesirable in a constant velocity joint 20 because the cyclic nature of the generated axial forces may result in vibrations that are in turn transmitted into the components to which the shafts are coupled. In the case of vehicular drivetrain applications, this can include the driven wheels, suspension, and other portions of the drivetrain, such as a differential or transmission. These vibrations can in turn be transmitted through these components into other portions of the vehicle, including the passenger compartment, where they may be sensed by an operator or passenger, such that the vibrations may result undesirable vehicle performance. A similar unbalanced force distribution exists in constant velocity joints having evenly spaced odd integer numbers of balls. In addition, the net generated axial force may vary as a function of the joint angle (α) through which the constant velocity joint is articulated as illustrated in the data for the three ball joint of FIG. 12.

The unbalanced forces are substantially zero in constant velocity joints having even integer numbers of drive balls 38, such as, for example 4, 6 and 8 ball joints, because the balls are diametrically opposed from one another and as the joint is articulated and rotated the number of balls generating axial forces in one direction and the number of balls generating axial forces in the other, opposite direction are equal and the opposing force vectors balance one another such that the resultant net generated axial force vector is substantially zero, as illustrated in FIG. 12. As also illustrated in FIG. 12, the resultant net generated axial force vector is substantially zero for all joint angles ($\alpha$). Since the net resultant force vector is substantially zero, the vibrations created during articulation and rotation of the constant velocity joint 20 and the driving and driven shafts 22, 24 are greatly reduced. The reduced vibrations of constant velocity joints 20 having even integer numbers of drive balls 38, pockets 36 and grooves 30 are very advantageous Referring to FIGS. 9 through 11, a second embodiment of the constant velocity joint is shown generally at 120. The features of the second embodiment of the constant velocity joint 120 that are similar to those of the first embodiment of the constant velocity joint 20 described above, are identified with the same reference numerals as the first embodiment of the constant velocity joint 20 preceded by the numeral 1. For example, the drive balls 38 of the first embodiment of the constant velocity joint 20 are identified by the reference numeral 138 in the second embodiment of the constant velocity joint 120.

The second embodiment of the constant velocity joint 120 includes an even number of drive balls 38, particularly four drive balls 138, four pockets 136 and four grooves 130. The pockets 136 and the grooves 130 are circumferentially and radially spaced equally about the second longitudinal axis $L_2$ (i.e., are angularly disposed about the longitudinal axis $L_2$ at ninety degrees relative to each other and first longitudinal axis L, respectively). Accordingly, the second embodiment of the constant velocity joint includes diametrically opposed drive balls 138 (i.e., each drive ball 138 is disposed opposite the longitudinal axis $L_2$ from another of the drive balls 138). It should be appreciated that the diametrically opposed drive balls 138 may be achieved with constant velocity joints having any even number of pockets 136, drive balls 138 and grooves 130 (i.e., 4, 6, 8, etc. drive balls 138, pockets 136 and grooves 130). As described herein, the diametrically opposed drive balls 138 provide substantially zero net resultant generated axial force (i.e., the sum of force vectors F illustrated schematically in FIG. 11), which is a significant reduction as compared to the net resultant generated axial force produced by friction between the drive balls 38 and the grooves 30 in constant velocity joints 20 having an uneven or odd integer number of drive balls 38, pockets 36 and grooves 30 (i.e., 3, 5, 7, etc. drive balls 38, pockets 36 and grooves 30). This is because with diametrically opposed drive balls 138, there is always an equal number of drive balls 138 translating within the grooves 130 in opposite directions, thereby producing a substantially zero net generated axial force.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A universal joint, comprising:
   an outer member defining an interior opening and a plurality, comprising at least four, grooves disposed within the interior opening and extending along a first longitudinal axis with each of the plurality of grooves being parallel to all other of the plurality of grooves and the first longitudinal axis;
   a one-piece inner member disposed within the interior opening having a second longitudinal axis and a bulbous end and defining a plurality of fixed pockets on the bulbous end corresponding to the plurality of grooves disposed radially about the second longitudinal axis with each of the plurality of pockets opposing one of the plurality of grooves, wherein the plurality of pockets comprise a curved, non-spherical shape or the plurality of grooves comprise a cross-section transverse to the longitudinal axis having a curved, non-circular shape, or a combination thereof; and
   a plurality of drive balls corresponding to the plurality of grooves, each drive ball having a spherical shape and rotatably disposed within and retained by one of the plurality of pockets and moveably disposed within one of the plurality of grooves, wherein the outer member, inner member and plurality of drive balls comprise a universal joint.

2. The universal joint of claim 1, wherein each of the plurality of pockets comprises the curved, non-spherical shape.

3. The universal joint of claim 2, wherein the curved, non-spherical shape of the plurality of pockets comprises a gothic arch.

4. The universal joint of claim 2, wherein the curved, non-spherical shape of the plurality of pockets comprises a parabola.

5. The universal joint of claim 2, wherein the curved, non-spherical shape of the plurality of pockets comprises an ellipse.

6. The universal joint of claim 2, wherein each curved, non-spherical pocket and the spherical drive ball disposed therein defines a pocket separation distance between the pocket and the drive balls.

7. The universal joint of claim 2, wherein each of the plurality of drive balls comprises a ball center and a central axis extending through the ball center of each of the plurality of drive balls and intersecting the first longitudinal axis at a perpendicular angle, and each of the plurality of drive balls is contacting one of the plurality of pockets along an annular contact interface.

8. The universal joint of claim 7, wherein:
   each drive ball and pocket comprises a first pocket radial line extending from the ball center to the annular contact interface and a second pocket radial line coplanar with the first pocket radial line and extending from the ball center to the annular contact interface on an opposing side of the central axis to define a pocket contact angle measured between the first pocket radial line and the second pocket radial line; and
   each drive ball contacts the corresponding groove along a first linear interface and a second linear interface and including a first groove radial line extending between the ball center and the first linear interface and a second groove radial line extending between the ball center and the second linear interface on an opposing side of the central axis to define a groove contact angle measured between the first groove radial line and the second groove radial line; and wherein the pocket contact angle is less than the groove contact angle to urge each drive ball against the corresponding groove as the inner member articulates relative to the outer member.

9. The universal joint of claim 1, wherein the plurality of grooves include the cross-section transverse to the longitudinal axis having the curved, non-circular shape engaging the spherical shape of the plurality of drive balls.

10. The universal joint of claim 9, wherein the curved, non-circular cross-section of the plurality of grooves comprises a gothic arch.

11. The universal joint of claim 9, wherein the curved, non-circular cross-section of the plurality of grooves comprises an ellipse.

12. The universal joint of claim 9, wherein the curved, non-circular cross-section of the plurality of grooves comprises a parabola.

13. The universal joint of claim 9, wherein each of the plurality of pockets comprises a curved, non-spherical shape comprising a cross-section transverse to the second longitudinal axis having a non-circular cross-section with the cross-section of the plurality of pockets being different from the cross-section of the plurality of grooves.

14. The universal joint of claim 9, wherein each groove and the drive ball disposed therein defines a groove separation distance between the groove and the drive ball.

15. The universal joint of claim 1, wherein each of the pockets comprises a spherical shape.

16. The universal joint of claim 1, wherein the universal joint is configured to provide a generated axial force that is substantially zero.

17. The universal joint of claim 16, wherein the pockets are circumferentially and radially spaced equally about the second longitudinal axis.

18. The universal joint of claim 1, wherein the plurality of grooves, pockets and drive balls comprises an even integer.

19. The universal joint of claim 18, wherein the universal joint is configured to provide a generated axial force that is substantially zero.

* * * * *